United States Patent
Degenhart et al.

(10) Patent No.: US 11,485,846 B2
(45) Date of Patent: Nov. 1, 2022

(54) PROCESS FOR ENHANCING THE MELT STRENGTH OF PROPYLENE-BASED POLYMER COMPOSITIONS

(71) Applicant: SABIC GLOBAL TECHNOLOGIES B.V., Bergen op Zoom (NL)

(72) Inventors: Peter Degenhart, Echt (NL); Ana Luisa Vaz, Geleen (NL); Martin Antonius van Es, Landgraaf (NL); Mark Berix, Sittard (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 746 days.

(21) Appl. No.: 16/060,515

(22) PCT Filed: Nov. 28, 2016

(86) PCT No.: PCT/EP2016/078978
§ 371 (c)(1),
(2) Date: Jun. 8, 2018

(87) PCT Pub. No.: WO2017/097618
PCT Pub. Date: Jun. 15, 2017

(65) Prior Publication Data
US 2018/0371224 A1 Dec. 27, 2018

(30) Foreign Application Priority Data
Dec. 11, 2015 (EP) .................................... 15199473

(51) Int. Cl.
*C08L 23/26* (2006.01)
*B29C 48/67* (2019.01)
*B29C 48/36* (2019.01)
*B29C 48/68* (2019.01)
*B29C 48/88* (2019.01)
(Continued)

(52) U.S. Cl.
CPC ............ *C08L 23/26* (2013.01); *B29C 48/361* (2019.02); *B29C 48/67* (2019.02); *B29C 48/682* (2019.02); *B29C 48/911* (2019.02); *C08F 110/06* (2013.01); *C08J 3/24* (2013.01); *C08J 3/247* (2013.01); *C08J 9/0023* (2013.01); *C08J 9/141* (2013.01); *C08K 5/14* (2013.01); B29C 2948/92561 (2019.02); B29C 2948/92619 (2019.02); B29C 2948/92704 (2019.02); B29C 2948/92885 (2019.02); B29C 2948/92895 (2019.02); B29K 2023/12 (2013.01); C08F 2500/09 (2013.01); C08F 2500/11 (2013.01); C08F 2810/10 (2013.01); C08J 2201/026 (2013.01); C08J 2201/03 (2013.01); C08J 2203/14 (2013.01); C08J 2323/10 (2013.01);
(Continued)

(58) Field of Classification Search
CPC .. C08L 23/26; C08L 2203/14; C08L 2203/30; C08J 3/24; C08J 9/141; C08J 3/247; C08J 9/0023; C08J 2201/03; C08J 2203/14; C08J 2323/12; C08J 2201/026; C08J 2323/10; C08F 110/06; C08F 2500/11; C08F 2500/09; C08F 2810/10; C08K 5/14; B29C 48/67; B29C 48/361; B29C 48/682; B29C 48/911; B29C 2948/92561; B29C 2948/92619; B29C 2948/92704; B29C 2948/92885; B29C 2948/92895; B29K 2023/12
See application file for complete search history.

(56) References Cited

U.S. PATENT DOCUMENTS 5,527,573 A * 6/1996 Park ......................... C08J 9/144
428/314.4
2008/0093763 A1* 4/2008 Mancosh ................ B29C 48/67
264/211
(Continued)

FOREIGN PATENT DOCUMENTS

EP 0384431 A2 8/1990
WO 9927007 A1 6/1999
(Continued)

OTHER PUBLICATIONS

PUBCHEM, Dimyristyl peroxydicarbonate, https://pubchem.ncbi.nlm.nih.gov/compound/Dimyristyl-peroxydicarbonate, accessed Apr. 12, 2021 (Year: 2015).*
(Continued)

*Primary Examiner* — Jacob T Minskey
*Assistant Examiner* — S. Behrooz Ghorishi
(74) *Attorney, Agent, or Firm* — Cantor Colburn LLP

(57) ABSTRACT

Disclosed is a process for preparation of a propylene-based polymer composition involving the steps of:
(a) mixing a propylene-based polymer and a peroxydicarbonate in a mixing device, wherein the mixing takes place at a temperature of ≤30° C., wherein the peroxydicarbonate is introduced into the mixing process in a dry form;
(b) keeping the mixed composition at a temperature of ≤30° C.;
(c) feeding the mixed composition into a melt extruder;
(d) homogenizing the mixed composition at a temperature where the propylene-based polymer is in solid state during an average residence time of ≥6.0 and ≤30.0 seconds;
(e) further homogenizing the mixed composition at a temperature at which the propylene-based polymer is in the molten state; and
(f) extruding the homogenized material from a die outlet of the melt extruder followed by cooling and solidification;
wherein the steps (a) through (f) are conducted in that order.

17 Claims, No Drawings

(51) Int. Cl.
*C08K 5/14* (2006.01)
*C08J 3/24* (2006.01)
*C08J 9/14* (2006.01)
*C08J 9/00* (2006.01)
*C08F 110/06* (2006.01)
*B29K 23/00* (2006.01)

(52) U.S. Cl.
CPC ....... *C08J 2323/12* (2013.01); *C08L 2203/14* (2013.01); *C08L 2203/30* (2013.01)

(56) References Cited

U.S. PATENT DOCUMENTS

2018/0016414 A1* 1/2018 Pehlert .................. C08J 9/00
2018/0273740 A1* 9/2018 Braun .................. C08F 255/04

FOREIGN PATENT DOCUMENTS

| WO | 0000520 A1 | 1/2000 | |
| WO | WO-0000520 A1 * | 1/2000 | .............. C08J 9/141 |
| WO | 2014044680 A1 | 3/2014 | |
| WO | 2014195114 A1 | 12/2014 | |
| WO | 2016126429 A1 | 8/2016 | |

OTHER PUBLICATIONS

Ketchum (ISO 1133 Vs. ASTM D1238), https://careertrend.com/info-12228294-iso-1133-vs-astm-d1238.html, accessed Apr. 9, 2021, (Year: 2018).*

Westmi j ze, Characteristics and Applicational Properties of Peroxide Suspensions, Makromol. Chem., Macromol. Symp. 29,283-29s (1989) (Year: 1989).*

Gotsis et al., "The Effect of Long Chain Branching on the Processability of Polypropylene in Thermoforming," Polymer Engineering and Science, May 2004, vol. 44, No. 5, pp. 973-982.

International Search Report for International Application No. PCT/EP2016/078978; International Filing Date: Nov. 28, 2016; dated Feb. 23, 2017; 5 Pages.

Ratzsch et al., "Polypropylene foams" Polypropylene: An A-Z Reference, Edited by J. Karger-Kocsis, Published in 1999 by Kluwer Publishers, Dordrecht; 8 Pages.

Ruinaard, Elongational Viscosity as a Tool to Predict the Foamability of Polyolefins, Journal of Cellular Plastics, vol. 42, May 2006, pp. 207-220.

Spitael et al., "Strain Hardening in Polypropylenes and Its Role in Extrusion Foaming," Polymer Engineering and Science, Nov. 2004, vol. 44, No. 11, pp. 2090-2100.

Tsenoglou et al., "Rheological Characterization of Long Chain Branching in a Melt of Evolving Molecular Architecture," Macromolecules 2001, 34, pp. 4685-4687.

Written Opinion of the International Searching Authority for International Application No. PCT/EP2016/078978; International Filing Date: Nov. 28, 2016; dated Feb. 23, 2017; 8 Pages.

Zwynenburg, "Predicting Polyolefin Foamability Using Melt Rheology", Jan. 1, 2008, Retreived from the Internet: URL: http://testplastic.com/pdfs/foams-2008-jim-zwynenburg.pdf [retrieved on May 20, 2016]; 3 Pages.

Nam et al., "Effect of Long-Chain Branches of Polypropylene on Rheological Properties and Foam-Extrusion Performances," Journal of Applied Polymer Science, vol. 96, No. 5, Jun. 5, 2005, pp. 1793-1800.

* cited by examiner

PROCESS FOR ENHANCING THE MELT STRENGTH OF PROPYLENE-BASED POLYMER COMPOSITIONS

CROSS REFERENCE TO RELATED APPLICATIONS

This application is a 371 of International Application No. PCT/EP2016/078978, filed Nov. 28, 2016, which claims priority to European Application Serial No. 15199473.8 filed Dec. 11, 2015 which are incorporated herein by reference in their entirety.

BACKGROUND

The present invention relates to a process for enhancing the melt strength of propylene-based polymer compositions. The invention further relates to propylene-based polymer compositions produced using such process. The invention also relates to foam structures produced using such propylene-based polymer compositions.

In the use of propylene-based polymer compositions to form shaped objects, it is necessary that these compositions have a sufficiently high melt strength to be able to mould the compositions into the desired shape. This is for example the case when propylene-based polymer compositions are shaped into objects via processes in which the composition is heated to above its melt temperature and subsequently shaped into the desired objects. In such process, a high shape stability is required of the propylene-based polymer composition at that temperature at which the object is shaped. The propylene-based polymer composition needs to be able to maintain its shape in the molten situation under such temperature conditions prior to solidification by cooling taking place.

Such objects to be prepared using propylene-based polymer compositions may for example include foam structures. A common method for the production of foam structures using propylene-based polymer compositions, as described in 'Polypropylene foams', Ratzsch et al., Springer, 1999, DOI: 10.1007/978-94-011-4421-6_86, p. 635-642, is via a process comprising the steps of:
  (i) bringing the propylene-based polymer composition in a molten condition;
  (ii) introducing pockets of gaseous material into the molten propylene-based polymer composition to form a molten propylene-based polymer composition comprising foam cells;
  (iii) moulding the molten propylene-based polymer composition comprising foam cells into the desired shape comprising a foam structure; and
  (iv) solidifying the shaped foam structure by cooling to below the melting point of the propylene-based polymer composition.

Commonly, these steps are conducted in the presented order.

A critical element in this process is the formation of the foam cells in step (ii). Depending on the nature of the processed material, the foam structure may comprise a certain quantity of closed cells. In the context of the present invention, closed cells may be understood to be pockets of gaseous material that are on all sides surrounded by closed cells walls, such that the gaseous material in each cell is not in contact with the gaseous material in another cell. Such cell walls may for example comprise the propylene-based polymer composition.

For certain applications, it is desirable that the foam structure comprises a certain high fraction of closed cells. A high fraction of closed cells may contribute to the thermal insulation value of a foamed structure. Furthermore, a high fraction of closed cells may contribute to the strength of a foamed structure such as in terms of flexural modulus and tensile strength.

Furthermore, it is desirable that these foam structures have a certain low density. For example, the density of the foam structures may be ≤175 kg/m$^3$, alternatively ≤150 kg/m$^3$. Foam structures having such low density comply with requirements of weight for applications such as construction panels for temporary shelters.

Another important characteristic is that the temperature range in which foam structures having such desired high fraction of closed cells and having such desired low density may be produced by extrusion foam production methods is sufficiently broad. This temperature range is also referred to as the foamability window. Preferably, the foamability window is ≥10° C. If the foamability window is too narrow, this presents a significant burden on the foam processing equipment, as fluctuations in processing temperature need to be avoided. Fluctuations beyond the foamability window of a material to be foamed may lead to off-spec material which is unsuitable to be sold commercially for reasons of not meeting the quality requirements.

In order to achieve the above properties, the propylene-based polymer composition needs to have a sufficiently high melt strength. The melt strength presents an indication of the extent to which the individual polymeric molecules manage to maintain their positions towards each other under conditions where the polymer composition is in a molten state.

Various methods have been suggested to improve the melt strength of propylene-based polymer compositions. WO99/27007A1 discloses the reacting of polypropylene with peroxydicarbonate at a temperature of between 150° C. and 300° C. A disadvantage of this method is that reaction at such temperatures does lead to a poor distribution of branching of the propylene-based polymer composition. This leads to not achieving the desired melt strength.

WO2014/195114A1 discloses the reaction of polypropylene with a thermally decomposing free-radical forming agent and a bifunctionally unsaturated monomer. A disadvantage hereof is that this process involves multiple reaction steps, such as a first reaction to obtain a branched polypropylene and a subsequent further reaction with unreacted polypropylene which has to be introduced into the melt extruder via a side extruder.

For that reason, there is an ongoing need to develop a method for improving the melt strength of propylene-based polymer compositions.

BRIEF SUMMARY

This object has now been achieved according to the present invention by a process for preparation of a propylene-based polymer composition involving the steps of:
  (a) mixing at least one propylene-based polymer and at least one peroxydicarbonate in a mixing device, wherein the mixing takes place at a temperature of 30° C., wherein the peroxydicarbonate is introduced into the mixing process in a dry form, thereby obtaining a mixed composition;
  (b) keeping the composition at a temperature of 30° C.;
  (c) feeding the composition into a melt extruder via a feed inlet;

(d) homogenizing the composition fed into the melt extruder at a temperature where the propylene-based polymer is in solid state in a first section of the extruder during an average residence time of 6.0 and 30.0 seconds;

(e) further homogenizing the composition fed into the melt extruder in a subsequent second section of the melt extruder at a temperature at which the propylene-based polymer is in the molten state, thereby obtaining a homogenized material; and (f) extruding the homogenized material from at least one die outlet of the melt extruder followed by cooling and solidification wherein the steps (a) through (f) are conducted in that order.

DETAILED DESCRIPTION

Such process may result in a propylene-based polymer composition that has an improved melt strength. Furthermore, propylene-based polymer compositions obtained via such process may be suitable for the production of foam structures via melt extrusion having a low foam density and a high fraction of closed cells.

An essential feature of the process according to the present invention is that the propylene-based polymer is in solid state in the first section of the melt extruder where the reaction takes place. The reaction takes place in the section of the melt extruder where no melt is present. The section is designed especially to improve the reaction kinetics in the sloid state.

The process according to the invention shows an improved simultaneous mixing and reaction.

Propylene-based polymers that may be used in the process according to the present invention include for example propylene homopolymers. Alternatively, the propylene-based polymer may be a propylene copolymer. Such propylene copolymer may be a propylene random copolymer. Alternatively, such propylene copolymer may be a heterophasic propylene copolymer. It is preferred that the propylene-based polymer is a propylene homopolymer.

The propylene-based polymer may for example have a melt mass flow rate as determined in accordance with ISO 1133-1 (2011), at a temperature of 230° C. and a load of 2.16 kg, of 1.0 and 10.0 g/10 min, alternatively 1.5 and 7.0 g/10 min, alternatively 2.0 and 5.0 g/10 min.

The propylene copolymer may for example comprise 0.5 and 7.0% by weight of polymeric units derived from one or more comonomers, alternatively 1.0 and 5.0% by weight. The comonomers may for example be one or more selected from ethylene, 1-butene, 1-pentene, 4-methyl-1-pentene, 1-hexene, 1-heptene and/or 1-octene. Preferably, the α-olefin comonomer is ethylene.

The heterophasic propylene copolymer may for example comprise a matrix phase and at least one dispersed phase. The matrix phase of the heterophasic propylene copolymer may for example comprise a propylene polymer such as a propylene homopolymer or a propylene-based copolymer. The matrix phase may for example comprise a propylene homopolymer. The propylene-based copolymer may for example be a copolymer of propylene and an α-olefin comonomer. The propylene-based copolymer may for example comprise 20.0%, alternatively 10.0%, alternatively 5.0% by weight with regard to the total weight of the propylene-based copolymer of monomeric units derived from an α-olefin comonomer. The propylene-based copolymer may comprise for example 0.5% by weight, alternatively 1.0% by weight, alternatively 2.0% by weight with regard to the total weight of the propylene-based copolymer of monomeric units derived from an α-olefin comonomer. The α-olefin comonomer may for example be selected from the groups of ethylene and/or α-olefins having 4 and 10 carbon atoms. In an embodiment, the α-olefin comonomer may for example be one or more selected from ethylene, 1-butene, 1-pentene, 4-methyl-1-pentene, 1-hexene, 1-heptene and/or 1-octene. Preferably, the α-olefin comonomer is ethylene.

The dispersed phase of the heterophasic propylene copolymer may for example comprise an ethylene-propylene elastomer. The ethylene-propylene elastomer may for example comprise 10.0% and 65.0 by weight, alternatively 20.0% and 50.0% by weight of polymeric units derived from ethylene, with regard to the total weight of the ethylene-propylene elastomer. The dispersed phase may for example be present in an amount of 5.0% and 40.0% by weight, alternatively ≥15.0% and ≤35.0% by weight, with regard to the total weight of the heterophasic propylene copolymer.

The fractions of matrix phase and dispersed phase of the heterophasic propylene copolymer may for example be determined via nuclear magnetic resonance spectroscopy (NMR) which is well known in the art. Other methods for determination thereof known in the art may also be used.

The propylene-based polymer may be produced via any process for the production of propylene-based polymers known in the art. Such processes may for example include one or more of gas-phase polymerisation processes, slurry-phase polymerisation processes, and solution polymerisation processes. Such processes may for example be catalytic polymerisation processes. Such catalytic polymerisation processes may for example be performed in the presence of one or more of a Ziegler-Natta type catalyst, a chromium-type catalyst, a single-site type catalyst such as a metallocene-type catalyst, or any other type of catalyst known in the art of production of propylene-based polymers. Such processes may for example involve a single polymerisation stage or alternatively multiple polymerisation stages. Such process involving multiple polymerisation stages may for example involve multiple polymerisation stages in series. Such multiple polymerisation stages may be performed in a single polymerisation reactor or in multiple polymerisation reactors. Such multiple stage polymerisation process may for example comprise one or more gas-phase polymerisation reactor, one or more slurry-phase polymerisation reactor, and/or one or more solution polymerisation reactor, or any combination of such reactors in any order.

It is preferred that the propylene-based polymer has an average particle size of ≤3000 μm. More preferably, the average particle size of the propylene-based polymer is ≤2500 μm, alternatively ≤2000 μm. It is also preferred that the propylene-based polymer has an average particle size of ≥500 μm, alternatively ≥1000 μm. Most preferred is that the propylene-based polymer has an average particle size of ≥500 μm and ≤3000 μm, alternatively ≥1000 μm and ≤2000 μm. The use of a propylene-based polymer having such average particle size may contribute to the homogeneity of the chemical reaction occurring in step d) of the modification process. The average particle size may be determined as $D_{50}$ according to ISO 9276-2 (2014).

The peroxydicarbonate may for example be selected from dialkyl peroxydicarbonates wherein the alkyl groups are both the same. The alkyl groups may be straight or branched. The alkyl groups may each comprise 3-20 carbon atoms. Preferably, the alkyl groups each comprise 10-20 carbon atoms.

Preferably, the peroxydicarbonate is selected from diisopropyl peroxydicarbonate, dibutyl peroxydicarbonate, di(2-ethylhexyl) peroxydicarbonate, di(4-tert-butyl cyclohexyl) peroxydicarbonate, ditetradecyl peroxydicarbonate or dihexadecyl peroxydicarbonate. More preferably, the peroxydicarbonate is selected from di(4-tert-butyl cyclohexyl) peroxydicarbonate, ditetradecyl peroxydicarbonate or dihexadecyl peroxydicarbonate. An advantage of these peroxydicarbonates is that their melting temperature is above the temperature at which the mixing of the propylene-based polymer and the peroxydicarbonate occurs, so that they can be dosed to the mixing device in a solid state. Most preferably, the peroxydicarbonate is dihexadecyl peroxydicarbonate.

It is advantageous that the peroxydicarbonate may be mixed in the form of solid flakes. In a preferred way, the peroxydicarbonate is used in the form of flakes having an average particle size of ≤3000 μm. More preferably, the average particle size of the peroxydicarbonate is ≤2500 μm, alternatively ≤2000 μm. It is also preferred that the peroxydicarbonate has an average particle size of ≥500 μm, alternatively ≥1000 μm. Most preferred is that the peroxydicarbonate has an average particle size of ≥500 μm and ≤3000 μm, alternatively ≥1000 μm and ≤2000 μm. The use of a peroxydicarbonate having such average particle size may also contribute to the homogeneity of the chemical reaction occurring in step d) of the modification process. The average particle size may be determined as $D_{50}$ according to ISO 9276-2 (2014).

The peroxydicarbonate is introduced into the mixing process of step (a) in a dry form. A peroxydicarbonate in dry form may for example be a peroxycarbonate comprising similar quantities of moisture as present in the atmosphere where it is exposed to. For example, the peroxydicarbonate may comprise 3.0 wt % of water, preferably 2.0 wt %, with regard to the total weight of the peroxydicarbonate. More preferably, the peroxydicarbonate may comprise 0.1 and 3.0 wt % of water, preferably 0.1 and 2.0 wt %, with regard to the total weight of the peroxydicarbonate. If water is present in higher quantities, this may negatively influence the powder processability of the peroxydicarbonate.

It is even more preferred that the ratio of the average particle size of the propylene-based polymer and the average particle size of the peroxydicarbonate that are introduced in step (a) is 0.5 and 1.5, alternatively 0.8 and 1.2, alternatively 0.9 and 1.1. The use of propylene-based polymer and peroxydicarbonate having such ratio of particle size may contribute to a homogeneous mixing of the particles in step (a).

In a most preferred way, the propylene-based polymer and the peroxydicarbonate that are introduced to step (a) each individually have an average particle size ≥1000 μm and ≤2500 μm as determined as $D_{50}$ according to ISO 9276-2 (2014), and a ratio of the average particle size of the propylene-based polymer and the average particle size of the peroxydicarbonate of 0.8 and 1.2. The use of propylene-based polymer and peroxydicarbonate having such particle dimensions may contribute to both a homogeneous particle mixing in step (a) as well as a homogeneous chemical reaction in step (d).

The peroxydicarbonate preferably is used in quantities of ≤3.00 wt % with regard to the weight of the propylene-based polymer, alternatively ≤2.50 wt %, alternatively ≤2.00 wt %, alternatively ≤1.50 wt %. The peroxydicarbonate preferably is used in quantities of ≥0.05 wt % with regard to the weight of the propylene-based polymer, alternatively ≥0.25 wt %, alternatively ≥0.50 wt %, alternatively ≥1.00 wt %. More preferably, the peroxydicarbonate preferably is used in quantities of ≥0.05 and ≤3.00 wt % with regard to the weight of the propylene-based polymer, alternatively ≥0.50 and ≤2.50 wt %, alternatively ≥1.00 and ≤2.00 wt %. The use of peroxydicarbonates in higher quantities may lead to an increased production of undesired byproducts such as alkyl alcohols. The use of peroxydicarbonates in lower quantities may not result in the desired modification of the propylene-based polymer taking place.

Preferably, the peroxydicarbonate has a half-life at 60° C. of at least 30 min and at most 180 min. The half-life of the peroxydicarbonate is the time required to reduce 50 mol % of an amount of the peroxydicarbonate at a given temperature. Such peroxydicarbonates allow for a controlled modification reaction of the propylene-based polymer in the melt extruder.

The mixing step (a) preferably is performed under an inert atmosphere, such as a nitrogen atmosphere. In such atmosphere, the quantity of oxygen molecules is sufficiently low to prevent the occurrence of oxidation reactions involving oxygen molecules, which may lead to undesired discoloration of the propylene-based polymer.

The mixing step (a) may be conducted in any common mixing device suitable for mixing polymer powder mixtures. Such mixing device may for example be a tumble mixer, a screw mixer, a conical screw mixer, or an agitator mixer. Such mixing devices may be continuously operating or batch-wise operating. Such mixing devices are well known to the person skilled in the art.

It is preferred that the mixing step (a) is conducted a temperature of ≤30° C., such as ≥0° C. and ≤30° C. by performing the mixing step at such temperature, uncontrolled reactions of the peroxydicarbonate and the propylene-based polymer may be prevented.

The composition obtained in mixing step (a) preferably is kept at a temperature of ≤30° C. during the period of storage between step (a) and the feeding (c) to the melt extruder. More preferably, the composition is kept at a temperature of ≥0° C. and ≤30° C. during the period of storage between step (a) and the feeding (c) to the melt extruder, even more preferably at a temperature of ≥0° C. and ≤20° C. If the composition obtained in mixing step (a) is stored under such conditions, the modification reaction does not take place in an uncontrolled manner prior to the melt extrusion process. This may be important for a.o. health and safety reasons. Preferably, the composition obtained in mixing step (a) is stored at a temperature of ≤30° C. for a period of ≤7 days, more preferably ≤3 days. A longer storage may also lead to a modification reaction being initiated in an uncontrolled manner prior to the melt extrusion process.

The composition obtained in step (a) is fed into a melt extruder. It is preferred that such melt extruder is a twin-screw melt extruder such as a co-rotating twin-screw melt extruder. Such melt extruder may have different units. Suitable melt extruders are known in the art. Such melt extruder may for example comprise a power unit and an extrusion unit. The power unit may comprise a motor and a gear box, to which the extruder screws are connected and by which the extruder screws are propelled. The extrusion unit may comprise one or more screws in a barrel, such as two screws in case of a twin-screw melt extruder, that are designed such that the material that is fed to the extruder is transported along the one or more screws from the area where the screws are connected to the power unit to the other end of the screws. The screws may be designed in such way that the material that is fed to the melt extruder is molten at certain zone(s) of the screws, and is homogenised in certain zone(s) of the screws. The screws may be designed in such way that the molten material is subjected to a pressure build-up towards the end of the screws such that the material is forced out of the extruder via for example a die comprising multiple holes.

The feed material that is introduced to the melt extruder may optionally comprise further ingredients such as stabilisers. Such stabilisers may for example be antioxidants. These antioxidants may for example be phenolic antioxidants and/or phosphite antioxidants. A stabiliser composition comprising one or more phenolic antioxidant(s) and one or more phosphite antioxidant(s) may for example be used. Phenolic antioxidants may for example be selected from monophenolic antioxidants, i.e. antioxidants containing one phenolic group per molecule, bisphenolic antioxidants i.e. antioxidants containing two phenolic groups per molecule, and polyphenolic antioxidants, i.e. antioxidants containing more than two phenolic groups per molecule, including 1,1,3-tris(2-methyl-4-hydroxy-5-t-butyl phenyl) butane, pentaerythritol tetrakis(3-(3,5-di-t-butyl-4-hydroxyphenyl) propionate, 1,3,5-trimethyl-2,4,6-tris(3,5-di-t-butyl-4-hydroxybenzyl)benzene, 1,3,5-tris(3,5-di-t-butyl-4-hydroxybenzyl)isocyanurate, and 1,3,5-tris(4-t-butyl-2,6-dimethyl-3-hydroxybenzyl)isocyanurate. Preferably, the phenolic antioxidant is pentaerythritol tetrakis(3-(3,5-di-t-butyl-4-hydroxyphenyl)propionate.

Phosphite antioxidants may for example be selected from trisnonylphenyl phosphite, trilauryl phosphite, tris(2,4-di-t-butylphenyl)phosphite, triisodecyl phosphite, diisodecyl phenyl phosphite, diphenyl isodecyl phosphite, and triphenyl phosphite. Preferably, the phosphite antioxidant is tris(2,4-di-t-butylphenyl)phosphite.

Preferably, the stabiliser that is introduced to the melt extruder comprises pentaerythritol tetrakis(3-(3,5-di-t-butyl-4-hydroxyphenyl)propionate as phenolic antioxidant and tris(2,4-di-t-butylphenyl)phosphite as phosphite antioxidant.

The feed material that is introduced to the melt extruder may for example comprise ≥0.05 and ≤0.50 wt % of stabilisers, with regard to the total weight of the feed material, preferably ≥0.05 and ≤0.25 wt %. Preferably, feed material that is introduced to the melt extruder comprises ≥0.05 and ≤0.50 wt %, more preferably ≥0.05 and ≤0.25 wt % with regard to the total weight of the feed material, of a stabiliser composition comprising pentaerythritol tetrakis(3-(3,5-di-t-butyl-4-hydroxyphenyl)propionate as phenolic antioxidant and tris(2,4-di-t-butylphenyl)phosphite as phosphite antioxidant.

In the case where the melt extruder is a twin-screw extruder, it is preferred that the extruder has a length:diameter ratio of ≥36, preferably ≥40. Furthermore, it is preferred that the length:diameter ratio is ≤50, preferably ≤46. More preferably, the length:diameter ratio of the melt extruder is ≥36 and ≤46. The length:diameter ratio is the ratio of the length of the barrel of the melt extruder over the outermost diameter of an individual extruder screw.

Feeding step (c) may take place at a feed inlet of the melt extruder. Preferably, this feed inlet is positioned in the front part of the first zone of the melt extruder, i.e. near the location where the screw is connected to the power unit. It is preferred that all of the material that is fed to the melt extruder is fed via this feed inlet positioned in the front part of the first zone of the melt extruder.

The composition obtained in mixing step (a) is subjected to homogenisation step (d) in a melt extruder. Such melt extruder preferably is a twin screw extruder such as a co-rotating twin screw extruder. The screw design is the melt extruder preferably is such that it allows for a first homogenisation of the material fed to the melt extruder at a temperature where the propylene-based polymer is in solid state in a first section. By the propylene-based polymer in solid state is preferably meant that at least 95 wt % of the propylene-based polymer is in the solid state, more preferably at least 98 wt %, even more preferably at least 99 wt %. It is preferred that the screw length of this first section of the twin-screw melt extruder has a length:diameter ratio (L/D ratio) of ≥10 and ≤15. Such L/D ratio allows for the modification reaction to be performed in that section to the desirable extent. The length:diameter ratio is the ratio of the length of the barrel of first section of the melt extruder over the outermost diameter of an individual extruder screw. It is preferred that in the section of the extruder where the homogenisation step (d) takes place, the extruder barrel temperature is ≤75° C.

Performing the homogenisation step (d) under such conditions may contribute to a controlled and stable process for modification of the propylene-based polymer with the peroxydicarbonate. This may lead to a propylene-based polymer composition with modified melt mass-flow rate and modified chain branching. It is preferred that the average residence time of the composition in the section where homogenisation at a temperature where the propylene-based polymer is in solid state takes place is ≥6.0 s, preferably ≤7.0 s, more preferably ≥8.0 s. It is further preferable that the average residence time of the composition in the section where homogenisation at a temperature where the propylene-based polymer is in solid state takes place is ≤30.0 s, more preferably ≤20.0 s, even more preferably ≤15.0 s. Even more preferably, the average residence time of the composition in the section where homogenisation at a temperature where the propylene-based polymer is in solid state takes place is ≥6.0 s and ≤15.0 s, even more preferably ≥7.0 s and ≤15.0 s. Such average residence time of the composition in the section where homogenisation at a temperature where the propylene-based polymer is in solid state takes place may contribute to the reaction of the peroxydicarbonate and the propylene-based polymer to be conducted in a controlled and safe manner.

Subsequent to the homogenisation step (d), the composition is subjected to a further homogenisation (e) in a subsequent second section of the melt extruder at a temperature at which the propylene-based polymer is in the molten state. For example, the homogenisation step (e) may be performed under conditions where the temperature of the composition is ≥160° C., more preferable ≥180° C. The homogenisation step (e) preferably is performed under conditions where the temperature of the composition is ≤300° C., more preferably ≤280° C. More preferably, the homogenisation step (e) is performed under conditions where the temperature of the composition is ≥160° C. and ≤300° C., even more preferably ≥180° C. and ≤280° C. During the homogenisation step (e), further ingredients may be fed to the melt extruder, such as for example via a feed inlet positioned along the length of the melt extruder in the area of the second section of the extruder screw. Thus, a homogenised material is obtained.

The homogenised material obtained in step (e) is subsequently extruded in a step (f) from at least one die outlet of the melt extruder, followed by cooling and solidification. This results in the obtaining of a solid propylene-based polymer composition which may be further processed into the desired application or into an intermediate product in one or more further processing step(s).

The propylene-based composition obtained with the process according to the present invention may for example be used for the production of foamed objects. The present invention also relates to foamed objects produced using a propylene-based polymer composition obtained via the process according to the invention.

The propylene-based polymer composition may be formed into foam structures by a melt processing step. Such melt processing step may be performed in a second melt extruder. A blowing agent may be added to the melt processing to induce the formation of foam cells. Such blowing agent may be any blowing agent commonly known to the person skilled in the art. For example, the blowing agent may be a chemical blowing agent or a physical blowing agent. Such chemical blowing agents may for example comprise sodium hydrogen carbonate, citric acid derivatives, azodicarbonamide, hydrazo dicarbonamide, 4.4'-oxybis (benzenesulfonyl hydrazide), N, N-dinitroso pentamethylene tetramine, 5-phenyltetrazole, p-Toluene sulfonyl hydrazide, and/or p-Toluene sulphonyl semicarbazide.

The blowing agent may for example be selected from nitrogen, carbon dioxide, isobutane, pentane and cyclopentane. Preferably, the blowing agent is isobutane.

The blowing agent may be introduced into the melt extruder at a location where the propylene-based polymer composition according to the invention is in a molten state. For example, the blowing agent may be introduced in quantities of 1.0 and 20.0 wt % with regard to the weight of the propylene-based polymer composition, alternatively 1.5 and 10.0 wt %, alternatively 2.0 and 5.0 wt %. The introduction of such quantities of blowing agent may contribute to the formation of a foamed structure having a desired low density in combination with a desired high fraction of closed cells. It is preferred that 2.0 and 10.0 wt %, even more preferred 2.0 and 5.0 wt % of isobutane with regard to the weight of the propylene-based polymer composition is used as blowing agent. In addition, further commonly known additives suitable for the production of foam structures from propylene-based polymer compositions may be used. For example, a quantity of a nucleating agent such as talc and/or fatty acid (bis)amides may be added. Preferably, talc is used as nucleating agent. For example, the nucleating agent may be added in quantities of 0.1 to 2.0 wt % such as 0.5 to 1.5 wt % with regard to the weight of the propylene-based polymer composition. Also, a quantity of a cell stabiliser such as glycerol monostearate (GMS), glycerol monopalmitate (GMP), glycol di-stearate (GDS), palmitides and/or amides for example stearyl stearamide, palmitamide and/or stearamide may be added. Preferably, glycerol monostearate is used as cell stabiliser. For example, this cell stabiliser may be added in quantities of 0.1 to 2.0 wt % such as 0.5 to 1.5 wt % with regard to the weight of the propylene-based polymer composition.

The propylene-based polymer composition may subsequently be extruded from a die outlet of the second melt extruder. The foam structure may thus be formed.

Different material properties of the propylene-based polymer composition according to the invention and of the foam structures produced using this composition have been determined via the methods described here.

As indicator for melt strength, the strain hardening coefficient as determined via extensional viscosity measurement at elongation strain rates of 1.0 $s^{-1}$, and/or 2.5 $s^{-1}$ at a temperature of 170° C. may for example be used. A higher strain hardening coefficient indicates the presence of long-chain branching. The presence of long-chain branching contributes to a higher melt strength. Thus, the strain hardening coefficient at 1.0 $s^{-1}$, and/or 2.5 $s^{-1}$ may be used as indicator for melt strength.

The strain hardening coefficient may be determined from a propylene-based composition according to the present invention via the formula:

$$SH = \frac{\eta_E}{3 * \eta_{E_0}}$$

Wherein
SH is the strain hardening coefficient at a given time and at a given elongation strain rate (dimensionless);
$\eta E$ is the extensional viscosity at a given time and at a given elongation strain rate (Pa·s);
$\eta_{EO}$ is the extensional viscosity at t=0, at a given elongation strain rate (Pa·s).

In the examples of the current invention, the strain hardening coefficient is determined for two conditions: a first $SH_{1.0}$ where the elongation strain rate is 1.0 $s^{-1}$ and the $\eta_E$ is determined at 2.75 s; and a second $SH_{2.5}$ where the elongation strain rate is 2.5 $s^{-1}$ and the $\eta_E$ is determined at 1.13 s.

As another indicator for the presence of long-chain branching, the shear thinning behaviour may be used. The shear thinning behaviour may be determined as the ratio of complex viscosity at given frequency:complex viscosity at a low frequency of 0.01 rad/s. This is also referred to as the viscosity ratio. The lower the viscosity ratio at higher frequencies such as 0.1 rad/s, 1.0 rad/s, 10 rad/s and 100 rad/s, the higher the shear thinning. The complex viscosity may also be determined using DMS at 200° C.

A further indicator for the presence of long-chain branching is the zero-shear viscosity. The zero-shear viscosity may be determined using DMS where viscosity data are fit using the Cross-model.

Furthermore, the present invention also relates to a propylene-based polymer composition obtain using the process according to the invention wherein the propylene-based polymer composition has:
  a strain hardening as determined via extensional viscosity measurement at a temperature of 170° C. at a strain elongation rate of 1.0 $s^{-1}$ measured at 2.75 s of ≥8.0, more preferably ≥10.0;
  a zero shear viscosity as determined using DMS with fit according to the Cross-model of ≥15000 Pa·s, more preferably ≥20000 Pa·s; and
  a viscosity rate defined as the ratio of complex viscosity $\eta^*$ at a frequency of 10 rad/s:complex viscosity at a frequency of 0.01 rad/s ($\eta_{0.01}$) of ≤0.15, more preferably ≤0.10, wherein the complex viscosity is determined via DMS.

The density of the foam structures was determined as the apparent overall density according to ISO 845 (2006).

The fraction of closed cells was determined by placing a sample of the foam having a known mass $M_A$ and a known density $\rho_{foam}$ as determined as the apparent overall density according to ISO 845 (2006) in a desiccator. The samples each had a length of 5 cm and a width of 3 cm. The desiccator was filled with water and a polyethylene glycol as surfactant. The pressure in the desiccator was reduced to 500 mbar. The samples were kept under these conditions for 10 min, following which the samples were removed and placed in methanol for 2 sec. All materials were used at room temperature (23° C.). Subsequently, the samples were placed in an oven at 60° C. for 5 min, following which the mass $M_B$ of the sample was determined. With this, the fraction of closed cells was determined according to the formula:

$$\text{Fraction closed cells} = \left(1 - \frac{\rho_{water}(M_B - M_A)}{\rho_{foam} * M_A}\right) * 100\%$$

Wherein $\rho_{water}$ is the density of water, set at 1000 kg/m³. $M_B-M_A$ is the mass of the absorbed quantity of water in the desiccator. Accordingly, the fraction closed cells is the fraction of cells the volume of which has not been filled with water.

The foamability window was determined as the temperature range of the foam extrusion in which foam structures having a density of ≤200 kg/m³ and a fraction closed cells of >98% can be prepared using 2.3 wt % isobutane with regard to the weight of the propylene-based polymer composition as blowing agent. This temperature range was determined by operating the foam extruder under such conditions that the temperature of the polymer melt in the area before the die (the die melt temperature) was varied starting at 175° C. and then stepwise reduced by 2-3° C. Foam samples were collected that were prepared at each set die melt temperature, and the foam density and the fraction closed cells was measured for each sample.

A further embodiment of the invention relates to the production of foamed objects via a melt extrusion foaming process using a propylene-based composition produced according to the process of the invention, wherein the foamability window is ≥10° C., the foamability window being defined as the temperature range where foams may be produced having an apparent overall density of ≤175 kg/m³ as determined according to ISO 845 (2006) and a closed cell content of 98% when using 2.3 wt % of isobutane as blowing agent. The invention also relates to a foamed object produced using a propylene-based composition produced according to the process of the present invention wherein the foamed object has an apparent overall density of ≤175 kg/m³ as determined according to ISO 845 (2006) and a closed cell content of ≥98%.

In a further preferred embodiment, the present invention also relates to a process for preparation of a propylene-based polymer composition involving the steps of:
  (a) mixing at least one propylene-based polymer and at least one peroxydicarbonate in a mixing device, wherein the mixing takes place at a temperature of ≥0° C. and ≤30° C., wherein the peroxydicarbonate is introduced into the mixing process in a dry form comprising ≤3.0 wt % of water with regard to the total weight of the peroxydicarbonate, thereby obtaining a mixed composition;
  (b) keeping the composition at a temperature of ≥0° C. and ≤30° C.;
  (c) feeding the composition into a melt extruder via a feed inlet;
  (d) homogenizing the composition fed into the melt extruder at a temperature where the propylene-based polymer is in solid state in a first section of the extruder during an average residence time of ≥7.0 and ≤15.0 seconds;
  (e) further homogenizing the composition fed into the melt extruder in a subsequent second section of the melt extruder at a temperature wherein the above the melt temperature of the propylene-based polymer is in the molten state, thereby obtaining a homogenized material; and
  (f) extruding the homogenized material from at least one die outlet of the melt extruder wherein the steps (a) through (f) are conducted in that order;
  and wherein
    the propylene-based polymer that is fed to the mixing device is fed in the form of solid particles having an average particle size of ≥1000 μm and ≤2000 μm as determined as $D_{50}$ in accordance with ISO 9276-2 (2014);
    the ratio of the average particle size of the propylene-based polymer and the average particle size of the peroxydicarbonate that are introduced into step (a) is ≥0.5 and ≤1.5, preferably ≥0.8 and ≤1.2, wherein the average particle size of the propylene-based polymer and the average particle size of the peroxydicarbonate are determined as $D_{50}$ in accordance with ISO 9276-4 (2014);
    the composition that is mixed in step (a) comprises ≥0.50 wt % and ≤2.50 wt % of peroxydicarbonate with regard to the weight of the propylene-based polymer, and wherein the peroxydicarbonate is selected from ditetradecyl peroxydicarbonate or dihexadecyl peroxydicarbonate;
    the melt extruder is a twin-screw extruder having a length:diameter ratio of ≥36, wherein the length is the length of the barrel of the extruder and the diameter is the outermost diameter of an individual extruder screw;
    the homogenizing step (d) takes place at an extruder barrel temperature of ≤75° C.

WO0000520 discloses a process for branching and foaming of polypropylene being performed by mixing in an extruder of polypropylene with a specific peroxide. The reaction takes place in the melt. The temperatures in the polymer melt in the mixing and metering zones of the extruder are preferably within the range 140° C. to 210° C. In contrast in the present invention the propylene-based polymer is in solid state in a first section of the melt extruder. The reaction takes place in the section of the melt extruder where no melt is present.

WO2016126429 discloses a process to form a composition comprising combining a polypropylene comprising at least 50 mol propylene and having a molecular weight distribution (Mw/Mn) greater than 6, a branching index (g'vis) of at least 0.97, and a melt strength greater than 10 cN determined using an extensional rheometer at 190° C.; and within the range from 0.01 to 3 wt of at least one organic peroxide, by weight of the polypropylene and organic peroxide. WO2016126429 does not disclose a process wherein the propylene-based polymer is in solid state in the first section of the melt extruder where the reaction takes place.

The invention will now be illustrated by the following non-limiting examples.

EXAMPLES

TABLE I

Materials used

| | |
|---|---|
| PP1 | Propylene-based polymer of grade SABIC PP571P, obtainable from SABIC, a homo-polypropylene having a melt mass-flow rate as determined in accordance with ISO 1133-1 (2011), at a temperature of 230° C. and a load of 2.16 kg, of 5.70 g/10 min, and having an average particle size as determined as $D_{50}$ according to ISO 9276-2 (2014) of 1200 μm. |
| PP2 | Propylene-based polymer of grade SABIC PP527K, obtainable from SABIC, a homo-polypropylene having a melt mass-flow rate as determined in accordance with ISO 1133-1 (2011), at a temperature of 230° C. and a load of 2.16 kg, of 3.00 g/10 min, and having an average particle size as determined as $D_{50}$ according to ISO 9276-2 (2014) of 1200 μm. |
| Peroxydicarbonate | Dihexadecyl peroxydicarbonate of grade Perkadox 24 L, obtainable from Akzo Nobel, having an average particle size of 1200 μm (CAS registry nr. 26322-14-5) |
| Phenolic stabiliser | Pentaerythritol tetrakis(3-(3,5-di-t-butyl-4-hydroxyphenyl)propionate of grade Irganox 1010, obtainable from BASF (CAS registry nr 6683-19-8) |
| Phosphite stabiliser | Tris(2,4-di-tert-butylphenyl) phosphite of grade Irgafos 168, obtainable from BASF (CAS registry nr. 31570-04-4) |

A. Preparation of Powder Mixture 100 parts by weight of a propylene-based polymer of was mixed in the solid phase at room temperature (23° C.) under nitrogen atmosphere for 30 m. in a Nauta single-screw conical mixer with a quantity of peroxydicarbonate and a quantity of stabiliser to obtain a homogeneously distributed powder mixture. The material compositions used for the preparation of the powder mixtures are presented in Table II.

TABLE II

| Example | PP1 | PP2 | Peroxydicarbonate | Phenolic stabiliser | Phosphite stabiliser |
|---|---|---|---|---|---|
| I | 100.0 | | 2.0 | 0.15 | 0.05 |
| II (C) | 100.0 | | 0 | 0.15 | 0.05 |
| III (C) | | 100.0 | 0 | 0.15 | 0.05 |

The numbers in Table II are parts by weight. Examples II and III are presented for comparative purposes.

B. Reactive Extrusion

The obtained powder mixture of example I from step A was introduced to a co-rotating twin-screw extruder having a screw diameter of 112 mm. The extruder had a length to diameter ratio (L/D ratio) of 42. The extruder was operated using temperature profiles as listed in Table III:

TABLE III extruder temperature profiles

| | | Temperature | |
|---|---|---|---|
| Zone | Zone length (L/D) | Profile I | Profile II |
| 1 | 4 | 40 | 40 |
| 2 | 4 | 150 | 130 |
| 3 | 5 | 150 | 170 |
| 4 | 3 | 160 | 180 |
| 5 | 4 | 225 | 225 |
| 6 | 4 | 225 | 225 |
| 7 | 4 | 225 | 225 |
| 8 | 3 | 230 | 230 |
| 9 | 3 | 230 | 230 |
| 10 | 4 | 230 | 230 |
| 11 | 4 | 230 | 230 |

The zones as presented in the above table represent subsequent zones along the length of the extruder. The powder mixture was introduced in zone 1, and removed from the extruder via a die positioned subsequent to zone 11. The temperatures in table III are set zone temperatures in ° C.

During the reactive extrusion process in which the extruder was operated using set temperatures according to profile I, the extruder was operated with a screw speed of 130 RPM and a throughput of 650 kg/h. The melt temperature at the die was 265° C., and the melt pressure at the die was 65 bar. The temperature conditions were set in such way that the powder mixture was kept at such temperatures that the propylene-based polymer was in the solid state in the first section of the extruder. As such, this section acted as solid mixing section. The reaction between the peroxide and the propylene-based polymer takes place in this section. The average residence time in this section was 7.0 s. From the extruder, a modified polypropylene (IA) was obtained by cooling and pelletizing the extruded product.

During the reactive extrusion process in which the extruder was operated using set temperatures according to profile II, the extruder was operated with a screw speed of 120 RPM and a throughput of 575 kg/h. The melt temperature at the die was 266° C., and the melt pressure at the die was 39 bar. The residence time in the solid state was 5.0 s. From the extruder, a modified polypropylene (IB) was obtained by cooling and pelletizing the extruded product.

C. Foaming

Foam structures were made using the modified polypropylenes (IA) and (IB) of step B and the reference polypropylenes (II) and (III). The polypropylenes were fed together with 1.0 wt % with regard to the weight of the polypropylene of Schulman PHBFPE50T, a 50% wt masterbatch of talc in LDPE and 1.0 wt % of glycerol monostearate (CAS registry nr. 31566-31-1) to a co-rotating ZSK 30 twin screw melt extruder having an L/D ratio of 40, equipped with a Aixfotec melt cooler and an annular foam die. The extruder was operated at a throughput of 10 kg/h, and the die pressure was maintained at 30 bar. In the extruder, the polypropylene was heated to 260° C. at which the material was in a molten condition. A quantity of isobutane as blowing agent to produce the foam was introduced into the melt in the extruder via an inlet positioned at zone 7 of the extruder. The quantity of isobutane used was 2.3 wt % with regard to the weight of the polypropylene. By further melt mixing of the material composition comprising the molten polypropylene and the blowing agent, a molten foamed material was obtained having a uniform foam cell distribution. In the Aixfotec melt cooler, the melt was cooled to temperatures of 175° C. in the area before the die. The molten foamed material forced out of the extruder via the annular die and cooled to form a solidified foam structures. The temperature in the area of the die was reduced stepwise from 175° C. down to 160° C. in steps of 2-3° C. At each temperature, foamed material was collected from which the density and the closed cell content were measured in order to determine the foamability window.

D. Determination of Properties

Of the modified polypropylene (IA) and (IB) of step B and the reference polypropylenes (II) and (III), the melt mass-flow rate, the strain hardening and the viscosity ratio was determined. Of the foams of polypropylenes (IA), (II) and (III), the foamability window, the foam density of foams prepared at 162° C. and the quantity of closed cells of foams prepared at 162° C. was determined. The results are presented in Table IV.

TABLE IV

|  | Example | | | |
| --- | --- | --- | --- | --- |
|  | IA | IB | II (C) | III (C) |
| FW | 13 |  |  |  |
| CC | 99.7 |  | <60 | <75 |
| FD | 130 |  | >400 | >350 |
| MFR$_{2.16}$ | 2.00 | 2.50[4)] | 6.70 | 3.00 |
| SH$_{1.0}$ | 10.2 |  | 1.0 | 1.0 |
| VR$_{0.1}$ | 0.53 |  | 0.90 | 0.90 |
| VR$_1$ | 0.24 |  | 0.64 | 0.60 |
| VR$_{10}$ | 0.09 |  | 0.31 | 0.23 |
| VR$_{100}$ | 0.03 |  | 0.10 | 0.08 |
| $\eta_0$ | 21260 |  | 5746 |  |

[4)]Due to significant fluctuations in the melt mass-flow rate of the material IB, it was not possible to produce foams from this material.

In which:

FW is the foamability window (° C.) as determined via the method described above;

CC is fraction of closed cells as determined by the above described water absorption method of the foam as produced at 162° C. (%);

FD is the density of the foam as produced at 162° C., determined as the apparent overall density according to ISO 845 (2006) (kg/m3);

MFR$_{2.16}$ is the melt mass-flow rate as determined in accordance with ISO 1133-1 (2011), at a temperature of 230° C. and a load of 2.16 kg (g/10 min);

SH$_{1.0}$ is the strain hardening coefficient as determined according to the method described above (-). For determining the strain hardening coefficient, an ARES G2 rheometer equipped with an EVF (extensional viscosity fixture) was used at 170° C.

VR is the ratio of the complex viscosity $\eta^*$ at given frequency:complex viscosity at a frequency of 0.01 rad/s ($\eta_{0.01}$), wherein the complex viscosity is determined via DMS as described above (-). In the table, VR$_{0.1}$ is the ratio of the complex viscosity at 0.1 rad/s ($\eta^*_{0.1}$):$\eta_{0.01}$; VR$_1$ is the ratio of $\eta^*_1$:$\eta_{0.01}$; VR$_{10}$ is the ratio of $\eta^*_{10}$:$\eta_{0.01}$; VR$_{100}$ is the ratio of $\eta^*_{100}$:$\eta_{0.01}$;

$\eta_0$ is the zero shear viscosity as determined using DMS (Pa·s) where viscosity data are fit using the Cross-model.

For determining the DMS spectrum, an ARES G2 rheometer was used at 200° C. measuring at frequencies of 0.01 rad/s to 100 rad/s, at a linear viscoelastic strain of 5%, using plates of 0.5 mm thickness produced according to ISO 1872-2 (2007).

The melt mass-flow rate of the peroxide-modified polypropylenes obtained from the reactive extrusion step B and the reference polypropylenes was determined according to ISO 1133-1 (2011). ISO 1133-1 (2011) relates to determination of the melt mass-flow rate (MFR) and melt volume-flow rate (MVR) of thermoplastics. The melt mass-flow rate was determined at 230° C. at a load of 2.16 kg.

From these results, it can be understood that a process according to the invention leads to an improved melt strength as presented by the stain hardening coefficient, the zero shear viscosity and the ratio of complex viscosity at given frequency:complex viscosity at a low frequency of 0.01 rad/s VR$_{0.1}$, VR$_1$, VR$_{10}$, and VR$_{100}$.

Furthermore, a process according to the invention leads to an increased closed cell content of the foams. Also, a process according to the invention leads to an improved formability window.

The invention claimed is:

1. Process for preparation of a propylene-based polymer composition comprising the steps of:
    (a) mixing a propylene-based polymer and a peroxydicarbonate in a mixing device, wherein the mixing takes place at a temperature of ≤30° C., wherein the peroxydicarbonate is introduced into the mixing process in a dry form, thereby obtaining a mixed composition;
    (b) keeping the mixed composition at a temperature of ≤30° C.;
    (c) feeding the mixed composition into a melt extruder via a feed inlet located in a first section of the melt extruder;
    (d) homogenizing the mixed composition fed into the first section of the melt extruder that is maintained at a temperature of ≤75° C. where the propylene-based polymer is in solid state in the first section of the melt extruder during an average residence time of ≥6.0 and ≤30.0 seconds;
    (e) further homogenizing the mixed composition fed into the melt extruder in a subsequent second section of the melt extruder at a temperature at which the propylene-based polymer is in the molten state, thereby obtaining a homogenized material; and
    (f) extruding the homogenized material from a die outlet of the melt extruder followed by cooling and solidification;
    wherein the steps (a) through (f) are conducted in that order.

2. Process according to claim 1 wherein the propylene-based polymer is fed to the mixing device in the form of solid particles having an average particle size of ≤3000 μm as determined as D$_{50}$ according to ISO 9276-2 (2014).

3. Process according to claim 1 wherein a ratio of an average particle size of the propylene-based polymer and an average particle size of the peroxydicarbonate that are introduced in step (a) is ≥0.5 and ≤1.5, wherein the average particle size of the propylene-based polymer and the average particle size of the peroxydicarbonate are determined as D$_{50}$ according to ISO 9276-2 (2014).

4. Process according to claim 1 wherein step (a) comprises ≥0.05 wt % and ≤3.00 wt % of the peroxydicarbonate, with regard to the weight of the propylene-based polymer.

5. Process according to claim 1 wherein the peroxydicarbonate is selected from diisopropyl peroxydicarbonate, dibutyl peroxydicarbonate, di(2-ethylhexyl) peroxydicarbonate, di(4-tert-butyl cyclohexyl) peroxydicarbonate, ditetradecyl peroxydicarbonate or dihexadecyl peroxydicarbonate.

6. Process according to claim 1 wherein the melt extruder is a twin-screw melt extruder.

7. Process according to claim 6 wherein the twin-screw melt extruder has a length:diameter ratio of ≥36, wherein the length is the length of a barrel of the melt extruder and the diameter is the outermost diameter of an individual extruder screw.

8. Process according to claim 6 wherein the melt extruder is a co-rotating twin-screw extruder.

9. Process according to claim 1, further comprising forming a foamed object from the propylene-based polymer composition.

10. Process according to claim 9, wherein the forming comprises melt processing the propylene-based polymer composition in a second melt extruder.

11. Process according to claim 10, wherein the forming the foamed object comprises foaming with a blowing agent comprising at least one of a chemical blowing agent or a physical blowing agent.

12. Process according to claim 11, wherein the blowing agent is present in an amount of ≥1.0 wt % and ≤20.0 wt % with regard to the weight of the propylene-based polymer composition.

13. Process according to claim 11, wherein the blowing agent comprises isobutane.

14. Process according to claim 9, wherein the density of the foamed object is ≤175 kg/m$^3$.

15. Process according to claim 9, wherein the fraction of closed cells of the foamed object as produced at 162° C. is at least 90%.

16. Process according to claim 1, wherein the propylene-based polymer has a melt mass flow rate as determined in accordance with ISO 1133-1 (2011), at a temperature of 230° C. and a load of 2.16 kg, of ≥1.0 and ≤10.0 g/10 min.

17. Process according to claim 1, wherein the propylene-based polymer has a strain hardening as determined via extensional viscosity measurement at a temperature of 170° C. at a strain elongation rate of 1.0 s$^{-1}$ measured at 2.75 s of ≥8.0.

* * * * *